(12) United States Patent
Li

(10) Patent No.: US 6,617,713 B1
(45) Date of Patent: Sep. 9, 2003

(54) STAGNANT ROTATING PREVENTION AND SAFETY CONTROL DEVICE FOR A MAIN SHAFT

(76) Inventor: Hsu-Chuan Li, PO Box 82-144, Taipei (TW)

(*) Notice: Subject to any disclaimer, the term of this patent is extended or adjusted under 35 U.S.C. 154(b) by 0 days.

(21) Appl. No.: 10/265,113

(22) Filed: Oct. 7, 2002

(51) Int. Cl.$^7$ .......................... H02K 7/116; H02K 15/16
(52) U.S. Cl. .......................... 310/52; 310/58; 310/52; 310/56; 310/64; 310/90; 310/60 R; 310/60 A; 310/59
(58) Field of Search .......................... 310/52, 56, 58, 310/90, 64, 59, 60 R, 60 A

(56) References Cited

U.S. PATENT DOCUMENTS

| | | | | |
|---|---|---|---|---|
| 5,382,858 A | * | 1/1995 | Sugiyama | 310/89 |
| 5,394,043 A | * | 2/1995 | Hsia | 310/90 |
| 5,998,894 A | * | 12/1999 | Raad | 310/68 B |
| 6,114,784 A | * | 9/2000 | Nakano | 310/59 |
| 6,239,518 B1 | * | 5/2001 | Matsubara et al. | 310/58 |

* cited by examiner

*Primary Examiner*—Thomas M. Dougherty
*Assistant Examiner*—Iraj A. Mohandesi
(74) *Attorney, Agent, or Firm*—Leong C. Lei

(57) ABSTRACT

A stagnant rotating prevention and safety control device for a main shaft is disclosed. The control device is provided with an oil fume detector, temperature control module and a vibration module of a rotating member, characterized in that the oil fume detector is provided with air-withdrawing channel A and air-withdrawing B each connected to the motor top cover and the two bearing position between the rotating shaft, and a air-withdrawing channel C is connected to the main shaft seat in between the top bearing position and the rotating shaft, and an air-withdrawing channel D is connected to the bottom bearing position between the main shaft seat and the bottom bearing for inspection of the amount of lubricant at the individual bearings being normal or abnormal, thereby providing a control device for prevention of stagnant rotation for a main shaft.

3 Claims, 9 Drawing Sheets

US 6,617,713 B1

STAGNANT ROTATING PREVENTION AND SAFETY CONTROL DEVICE FOR A MAIN SHAFT

BACKGROUND OF THE INVENTION

I. Field of the Invention

The present invention relates to a control device for prevention of stagnant rotation for a main shaft.

II. Description of the Prior Art

FIG. 1 shows the main shaft of a fabrication machine, wherein the interior of the motor housing 10 is provided in sequence a stator 11, a rotor 12 and a rotating shaft 13. The top end of the motor housing 10 is a motor top cover 15 with bearing 14. The bottom part of the housing 10 is a main shaft seat 18 having a top bearing 14 and a bottom bearing 17, and the rotating shaft 13 is pivotally passing through the bearing 14 of the motor top cover 15 and the top bearing 16, the bottom bearing 17 of the main shaft seat 18. The bottom section of the rotating shaft 13 is mounted with a tool clip 19 such that when the power source turns on, the clip 19 will rotate with the rotating shaft 18 and the rotor 12. After a long operation, the individual bearings will produce heat as a result of friction and the lubricant will be evaporated and dried and abnormal noise will be gradually produced. If this is serious, the shaft main is jammed. Further, if the clip 19 is used for a long time, and it may be knocked accidentally, the rotating of the rotating shaft 13 may not be rotating equilibrium, and if the operator does not notice the situation, the quality of the work piece is poor.

SUMMARY OF THE INVENTION

Accordingly, it is an object of the present invention to provide an stagnant rotating prevention and safety control device for a main shaft having an oil fume detector, temperature control module and a vibration module of a rotating member, characterized in that the oil fume detector is provided with air-withdrawing channel A and air-withdrawing B each connected to the motor top cover and the two bearing position between the rotating shaft, and a air-withdrawing channel C is connected to the main shaft seat in between the top bearing position and the rotating shaft, and an air-withdrawing channel D is connected to the bottom bearing position between the main shaft seat and the bottom bearing for inspection of the amount of lubricant at the individual bearings being normal or abnormal; the temperature control module is provided with temperature inspection loop A which is connected to the two bearing sides of the motor top cover, and a temperature inspection loop B is connected to the stator position, and a temperature inspection loop C is connected to the top bearing of the main shaft seat and the side of the bottom bearing so as to provide inspection of the temperature at the two bearings, stator, top bearing and the bottom bearing in the course of rotating, and the vibration module is provided with moving equilibrium inspection loop. and the bottom section of the main shaft is provided with vibration sensor for sensing the balance of the rotating shaft.

Yet another object of the present invention is to provide an stagnant rotating prevention and safety control device for a main shaft, wherein the top section of the rotating shaft is mounted with a positioning screw nut and a T-shaped screw nut, and the T-shaped screw nut is for the adjusting of floating distance of the rotating shaft and a securing screw bolt locks the T-shaped screw nut and the positioning screw nut, and the inner sleeve of the bottom section of the rotating shaft, the middle partition ring, and the specific screw nut are positioned with groove between the external sleeve, front cover of the bearing and the dust-protection cover, the groove is functioned to keep away cutting fluid and metallic dust entering the main shaft.

A further object of the present invention is to provide an stagnant rotating prevention and safety control device for a main shaft, wherein the rotating shaft at the two ends of the rotor of the main shaft is provided with a plurality of heat dissipation sleeve so as to avoid high temperature being transferred to the bearing at the two ends thereof.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
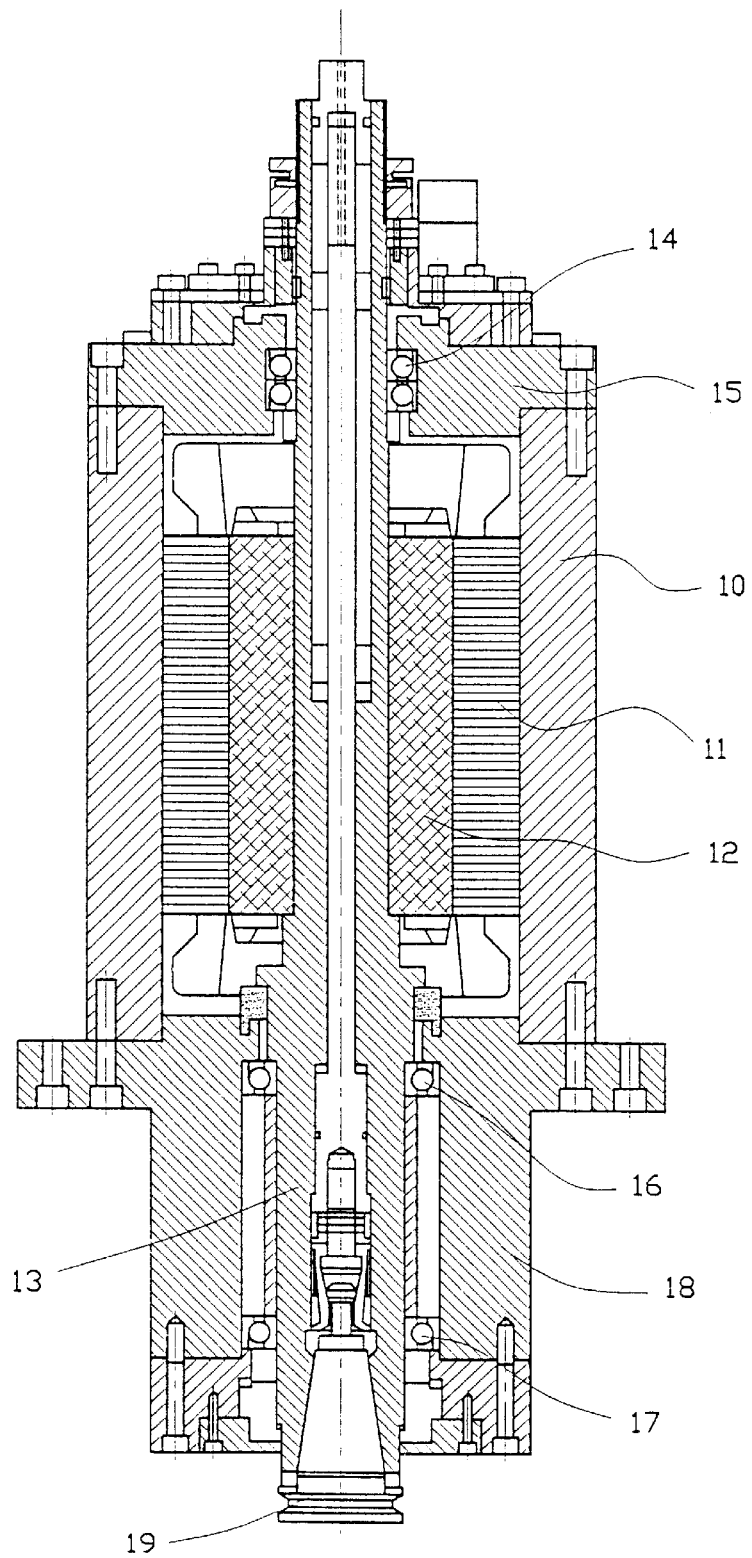
FIG. 1 is a sectional view of a conventional main shaft.
Figure 2:
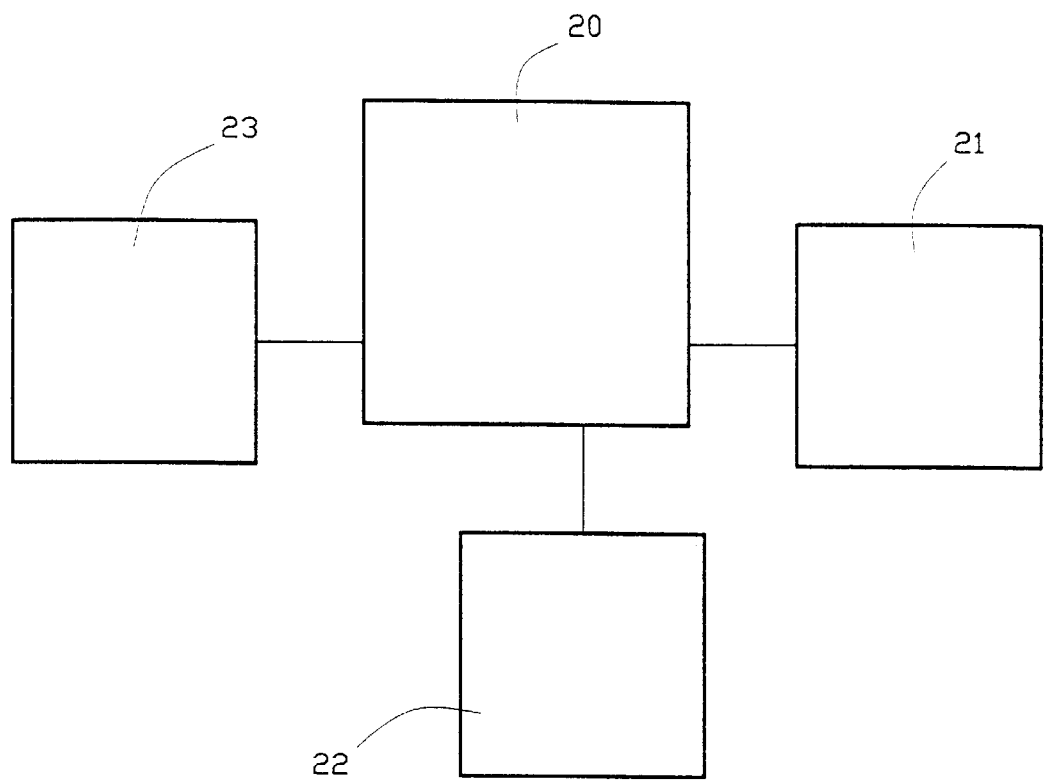
FIG. 2 is a flowchart of the preferred embodiment of the present invention.
Figure 3:
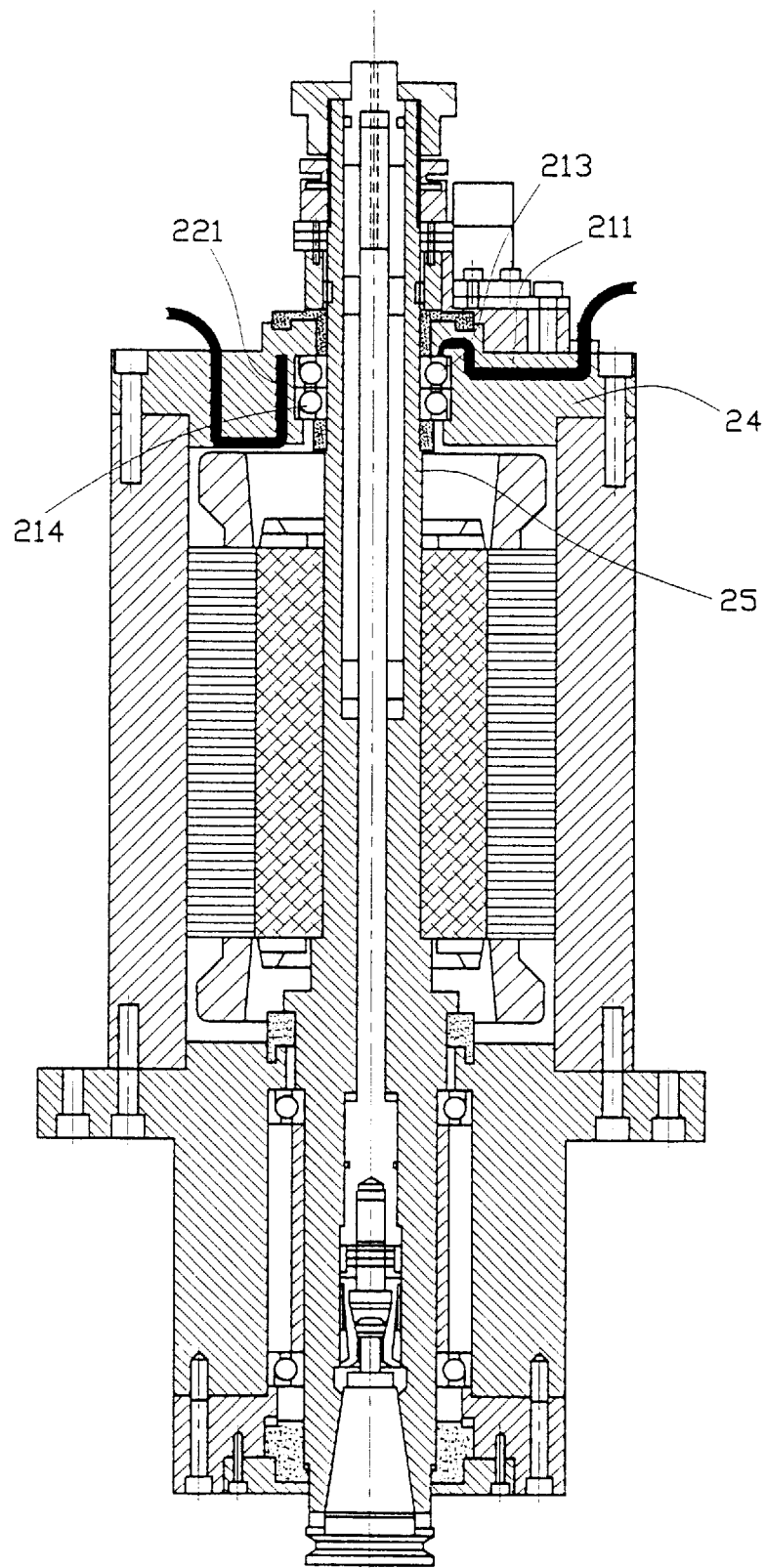
FIG. 3 is a sectional view showing the position of the air-withdrawing channel A and the temperature inspection loop A of the present invention.
Figure 4:
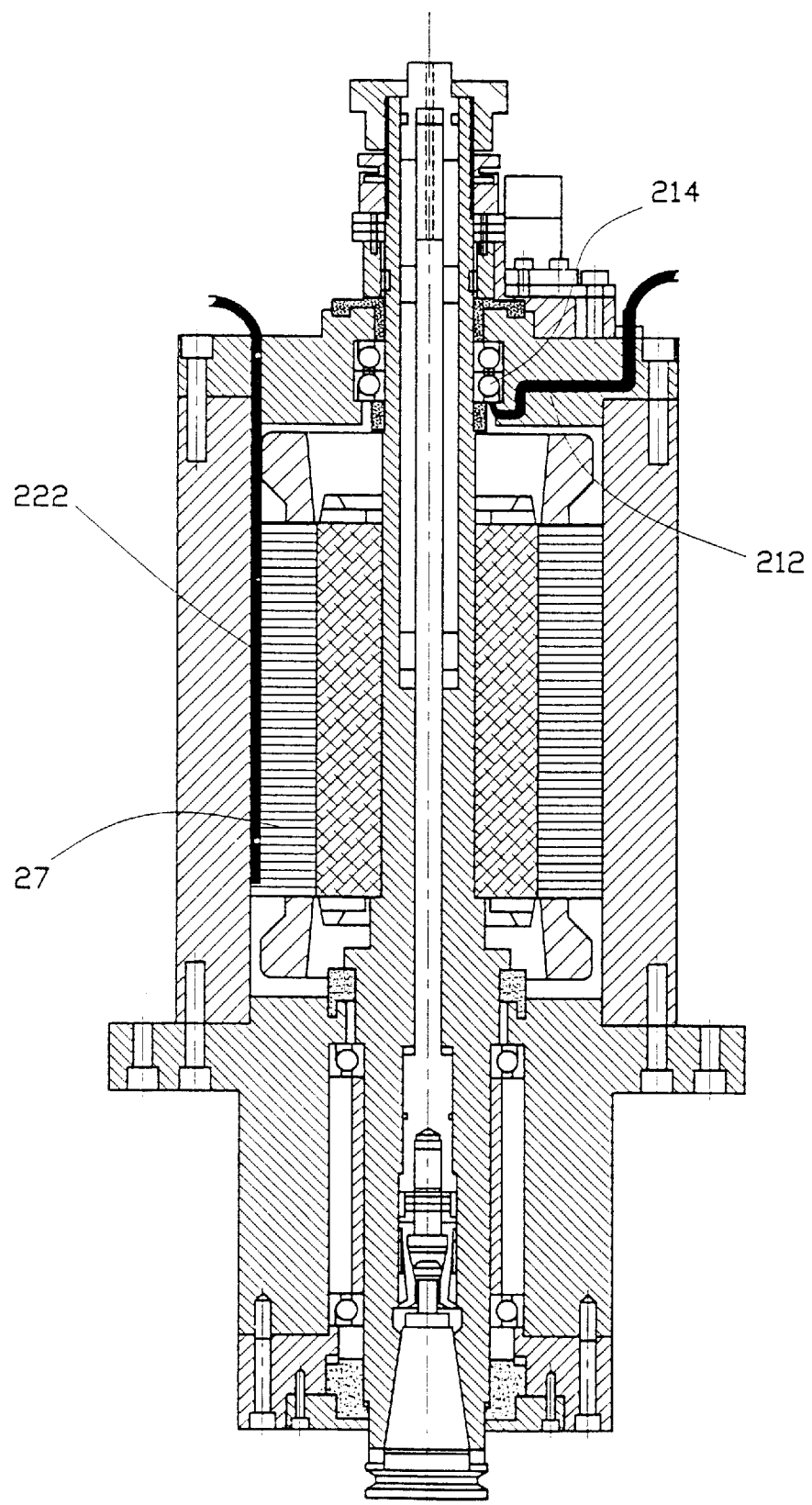
FIG. 4 is a sectional view showing the position of the air-withdrawing channel B and the temperature inspection loop B of the present invention.
Figure 5:
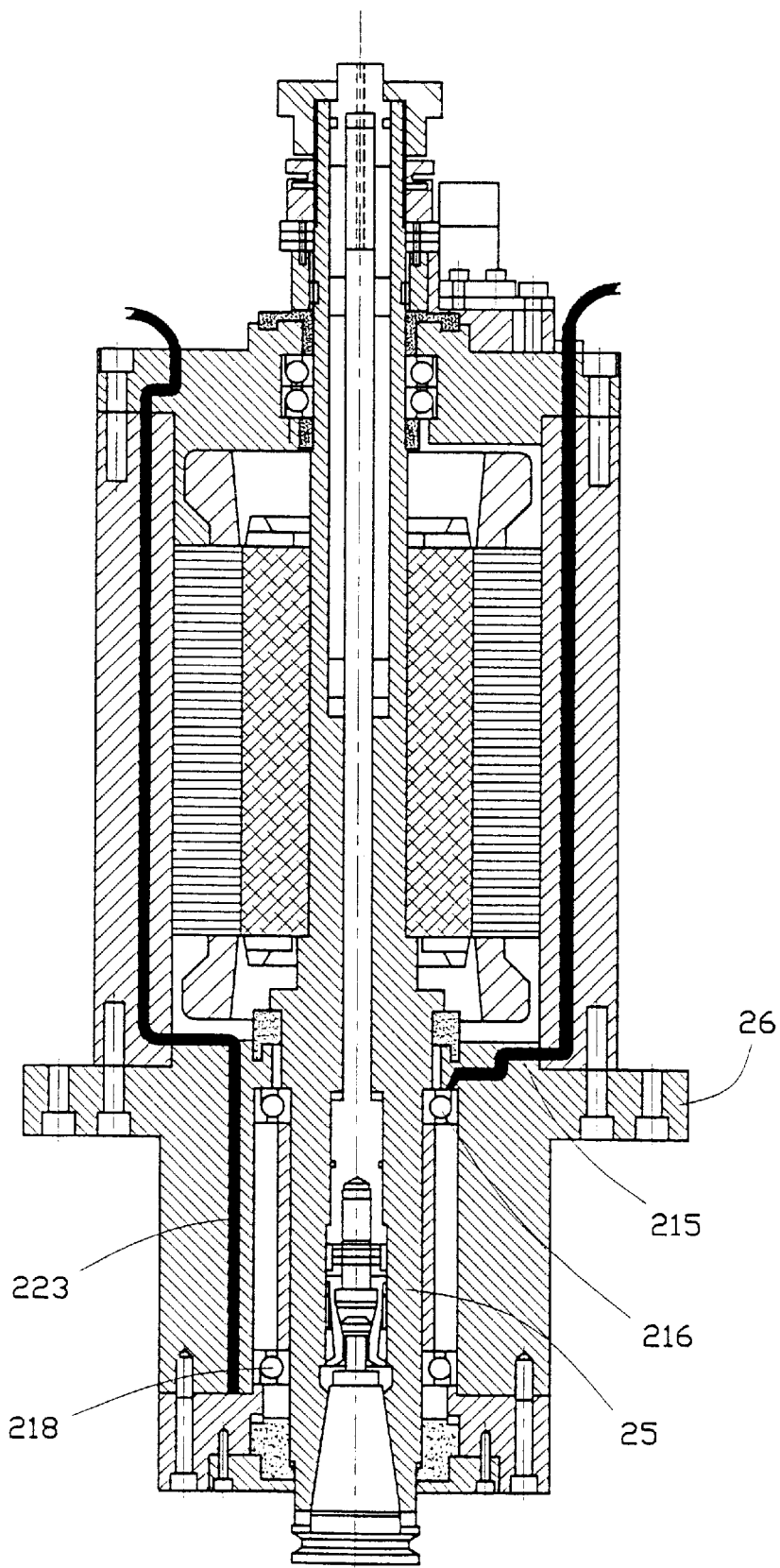
FIG. 5 is a sectional view showing the position of the air-withdrawing channel C and the temperature inspection loop C of the present invention.

Referring to FIG. 2, there is shown a stagnant rotating prevention and safety control device for a main shaft 20 having an oil fume detector 21, temperature control module 22 and a vibration module 23 of a rotating member. That is, the device of the present invention constitutes there time of control devices.

As shown in FIGS. 2 to 6, the oil fume detector 21 is provided with air-withdrawing channel A 211 and air-withdrawing B 212 each connected to the motor top cover 24 and the two bearing position and between the bearing 213, 214 position of the rotating shaft 25, and an air-withdrawing channel C 215 is connected to the main shaft seat 26 in between the top bearing 216 position of the rotating shaft 25. Next, an air-withdrawing channel D 217 is connected to the bottom bearing 218 positioned between the main shaft seat 25 and the bottom bearing 25. IF the amount of lubricant at the air-withdrawing channel A, B, C and D, 211, 212, 215, 217 is not normal, the operation of the main shaft will stop and record the abnormal at that particular time.

As shown in FIGS. 2 to 5, the temperature control module 22 is provided with temperature inspection loop A 221 which is connected to the two bearing 213, 214 sides of the motor top cover24, and a temperature inspection loop B 222 is connected to the stator 27 position, and a temperature inspection loop C 223 is connected to the top bearing 216 side, and the bottom bearing 218 side of the main shaft seat 26 so as to provide inspection of the temperature at the two bearings213, 214, stator 27, top bearing 216 and the bottom bearing 218 in the course of rotating and the result is transmitted to computer for recording. If the temperature of the bearing 213, 214, the stator 27, the top bearing 216 and the bottom bearing 218 increases to a set value, the operation will stop automatically, and record the abnormal condition. After the temperature has lowered the power is turned on and the operation starts again.

Figure 6:
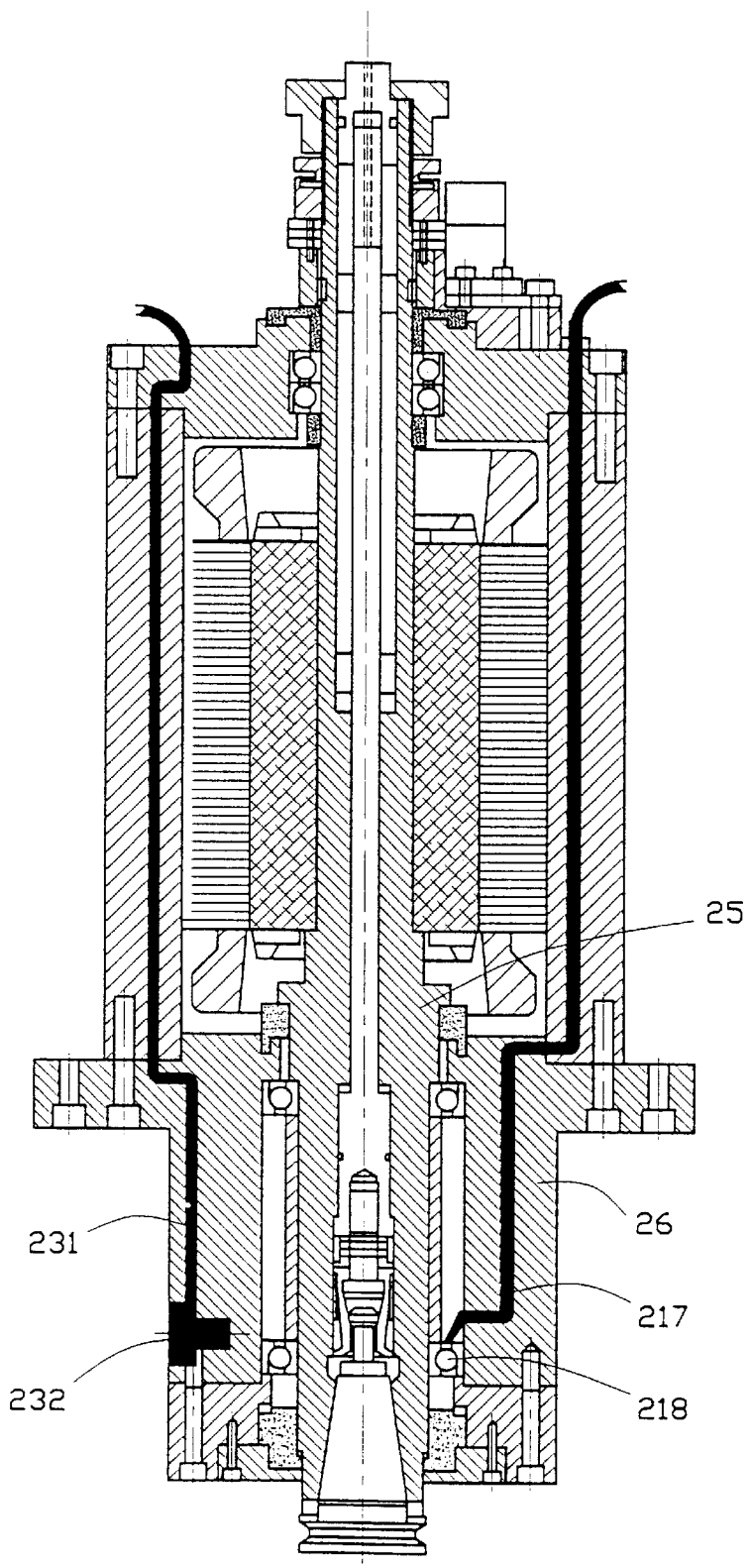
FIG. 6 is a sectional view showing the position of the air-withdrawing channel D and the temperature inspection loop D of the present invention.

As shown in FIGS. 2 and 6, the vibration module 23 is provided with moving equilibrium inspection loop 231 and the bottom section of the main shaft 26 is provided with a vibration sensor 232 for sensing the balance of the rotating shaft 25. If the rotation is not balance, the abnormal conditions will be transmitted to the computer, ensuring the operation of the tool device is normal.

Figure 7:
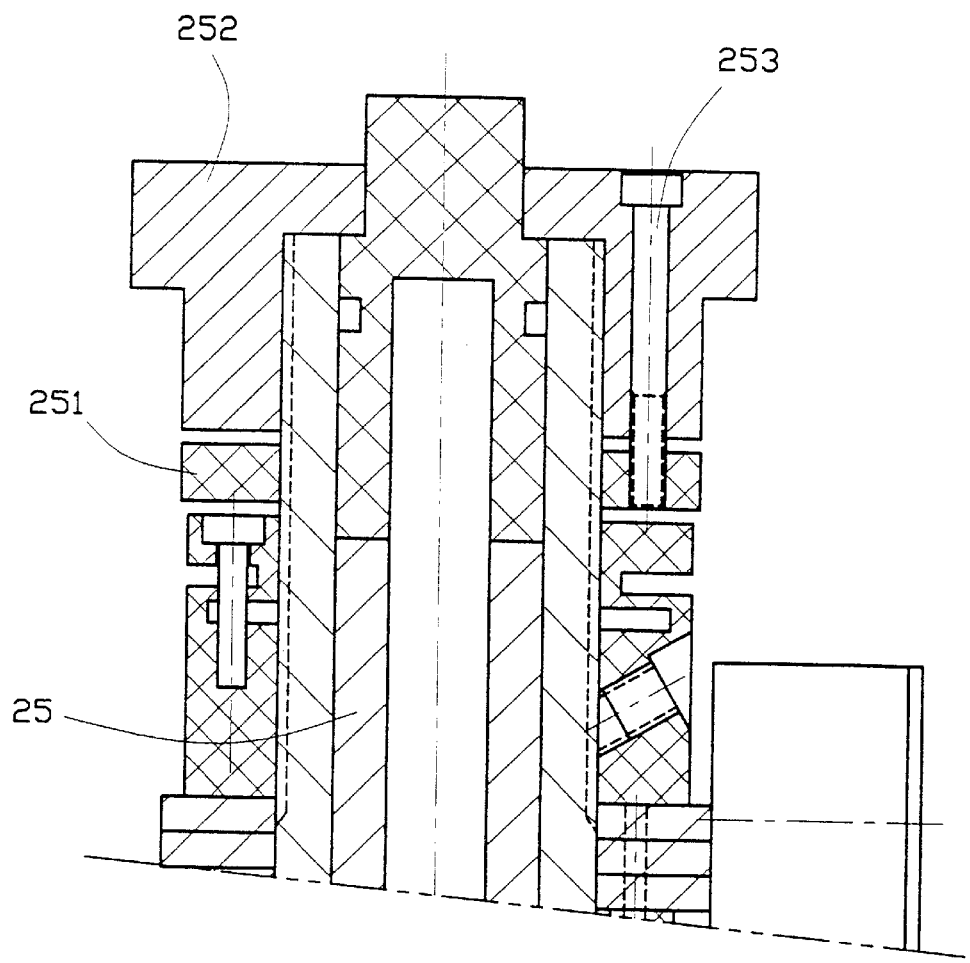
FIG. 7 is a sectional view of the top section of the rotating shaft of the present invention.

Referring to FIG. 7, the top section of the rotating shaft 25 is mounted with a positioning screw nut 251 and a T-shaped screw nut 252, and the T-shaped screw nut 252 is for the adjusting of floating distance of the rotating shaft 25 and a securing screw bolt 253 locks the T-shaped screw nut 252 and the positioning screw nut 251.

Figure 8:
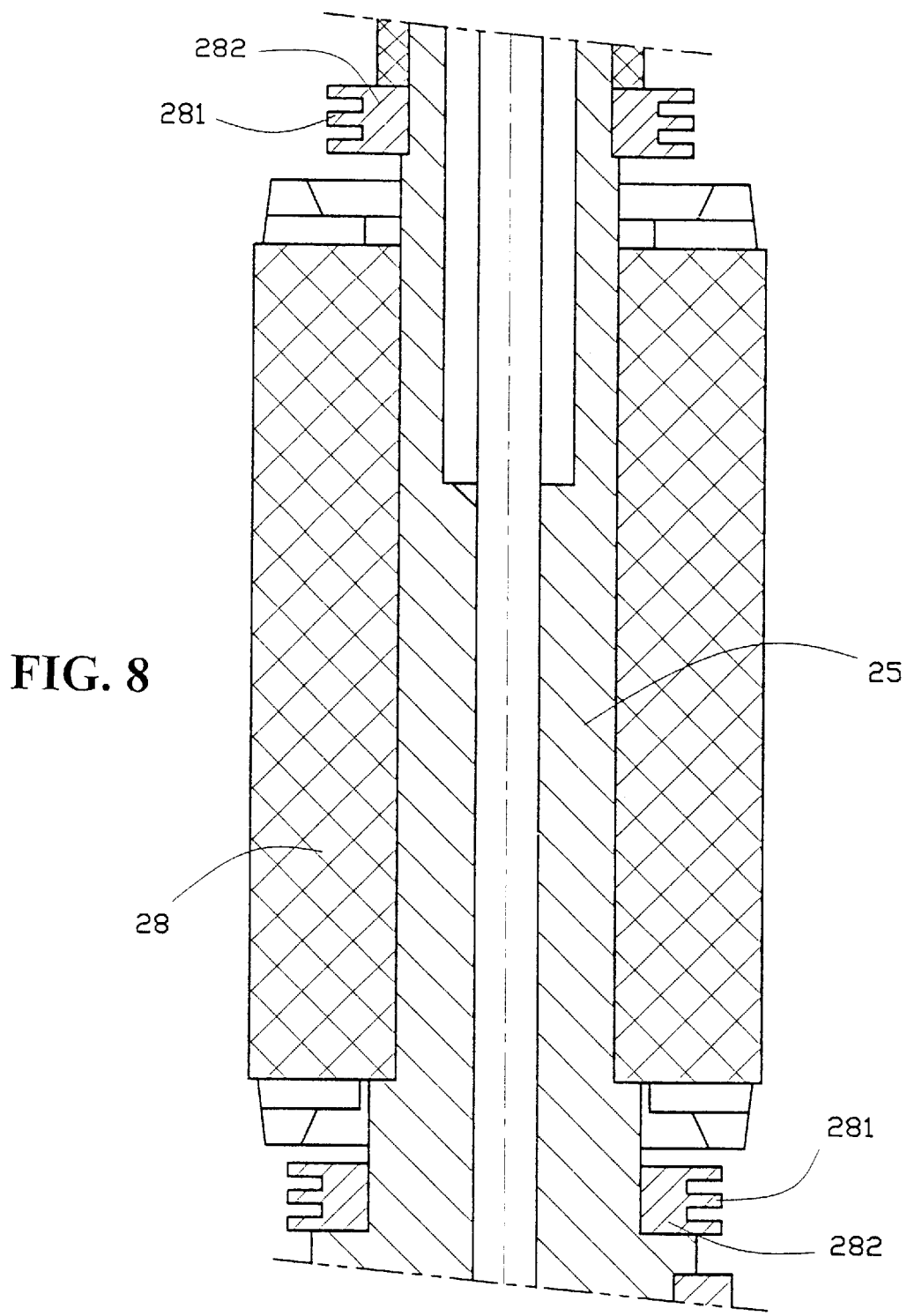
FIG. 8 is a sectional view of the position of the rotor in accordance with the present invention.
Figure 9:
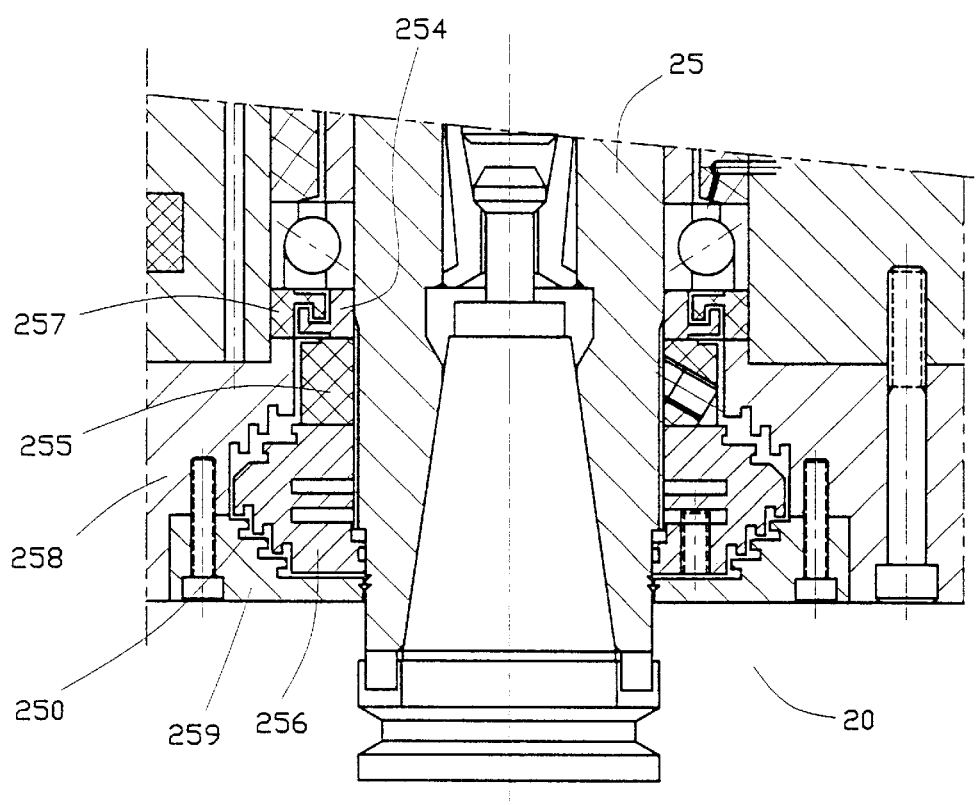
FIG. 9 is a sectional view showing the bottom section of the rotating shaft in accordance with the present invention.

Referring to FIG. 8, the rotating shaft 25 at the two ends of the rotor 28 is provided with a plurality of heat dissipation sleeves 282 so as to avoid high temperature being transferred to the bearing at the two ends thereof As shown in FIG. 9, the inner sleeve 254, the middle partition ring 255, and the specific screw nut 256 of the bottom section of the rotating shaft 25, are positioned with groove 250 between the external sleeve 257, front cover 258 of the bearing and the dust-protection cover 259. The groove 250 is functioned to keep away cutting fluid and metallic dust entering the main shaft 20.

In view of the above, the advantages of the present invention is that (1) the structure of the oil fume inspection device, the temperature controlled module and the vibration module of the rotating member is simple and the cost of production is low.

(2) the temperature increasing conditions and the equilibrium condition and the lubricant fume at the individual bearings can be detected, and the result can be transmitted to computer for recording. If the results show not normal, operation can be stopped automatically. This facilitates maintenance of the technicians.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An stagnant rotating prevention and safety control device for a main shaft having an oil fume detector, temperature control module and a vibration module of a rotating member, characterized in that the oil fume detector is provided with air-withdrawing channel A and air-withdrawing B each connected to the motor top cover and the two bearing position between the rotating shaft, and a air-withdrawing channel C is connected to the main shaft seat in between the top bearing position and the rotating shaft, and an air-withdrawing channel D is connected to the bottom bearing position between the main shaft seat and the bottom bearing for inspection of the amount of lubricant at the individual bearings being normal or abnormal; the temperature control module is provided with temperature inspection loop A which is connected to the two bearing sides of the motor top cover, and a temperature inspection loop B is connected to the stator position, and a temperature inspection loop C connected to the top bearing of the main shaft seat and the side of the bottom bearing so as to provide inspection of the temperature at the two bearings, stator, top bearing and the bottom bearing in the course of rotating, and the vibration module is provided with moving equilibrium inspection loop, and the bottom section of the main shaft is provided with vibration sensor for sensing the balance of the rotating shaft.

2. The control device of claim 1, wherein the top section of the rotating shaft is mounted with a positioning screw nut and a T-shaped screw nut, and the T-shaped screw nut is for the adjusting of floating distance of the rotating shaft and a securing screw bolt locks the T-shaped screw nut and the positioning screw nut, and the inner sleeve of the bottom section of the rotating shaft, the middle partition ring, and the specific screw nut are positioned with groove between the external sleeve, front cover of the bearing and the dust-protection cover, the groove is functioned to keep away cutting fluid and metallic dust entering the main shaft.

3. The control device of claim 1, wherein the rotating shaft at the two ends of the rotor of the main shaft is provided with a plurality of heat dissipation sleeve so as to avoid high temperature being transferred to the bearing at the two ends thereof.

* * * * *